United States Patent [19]

Takeshima et al.

[11] Patent Number: 4,702,334
[45] Date of Patent: Oct. 27, 1987

[54] CONTROL DEVICE FOR POWER STEERING APPARATUS

[75] Inventors: Sadao Takeshima; Hideo Yabe, both of Saitama, Japan

[73] Assignee: Jidosha Kiki Co., Ltd., Tokyo, Japan

[21] Appl. No.: 922,539

[22] Filed: Oct. 23, 1986

[30] Foreign Application Priority Data

Nov. 8, 1985 [JP] Japan .............................. 60-249059

[51] Int. Cl.$^4$ .............................................. B62D 5/06
[52] U.S. Cl. ..................................... 180/142; 180/133
[58] Field of Search ............... 180/142, 141, 143, 132, 180/133, 79.1

[56] References Cited

U.S. PATENT DOCUMENTS 4,476,529 10/1984 Nakamura et al. ................... 180/142
4,518,055 5/1985 Yagi et al. ............................ 180/142
4,549,627 10/1985 Takeshima .......................... 180/142

Primary Examiner—John J. Love
Assistant Examiner—Donn McGiehan
Attorney, Agent, or Firm—Blakely, Sokoloff, Taylor & Zafman

[57] ABSTRACT

In a control device for a power steering apparatus of which steering force is controlled on the basis of a control signal produced in accordance with a vehicle speed signal, the control device comprises means which outputs an engine rotation speed signal corresponding to an engine rotation speed, change relaxation means for relaxing changes in the engine rotation speed signal, and a switchover circuit which outputs an output signal of the change relaxation means instead of the vehicle speed signal when the vehicle speed signal is lost. Accordingly, even if a vehicle speed sensor is out of order for any reason, the power steering is carried out by the engine rotation speed signal, resulting small change of the steering force. Thus, this can protect the vehicle driver from dangerous conditions.

8 Claims, 2 Drawing Figures

CONTROL DEVICE FOR POWER STEERING APPARATUS

BACKGROUND OF THE INVENTION

The present invention relates to a control device for a power steering apparatus used in a vehicle such as an automotive vehicle.

In recent years, automotive vehicles provided with a power steering appratus for lessening the steering force have found increasing usage. According to this power steering apparatus, an oil flow rate or a reation force oil pressure is controlled in accordance witha vehicle speed signal, thereby making it possible to conduct a light and comfortable steering which is high substantially constant from a low speed range to a high speed range. However, for example, if the vehicle speed sensor is out of order at the time of the high speed running, a control under no vehicle speed signal, i.e., equivalent to the halt state will be conducted. This, the steering force rapidly becomes small, resulting in very dangerous running state.

To solve such a problem, as disclosed in the Japanese publication No. 62372/85 (Jikkaisho No. 60-62372), a method has been proposed wherein when it is detected that the number of engine revolutions is above a predetermined value under the condition where the vehicle speed signal fails to be obtained, the vehicle speed signal is switched to a fixed signal which is caused to be produced in a quasi-manner after a certain delay time from the detection time.

However, this method requires a large steering force when the vehicle is steered in the halt condition where the number of engine revolutions is low. Further, with this method, since the steering force suddenly changes before and after a predetermined number of engine revolutions, a preferable running condition cannot be obtained as well.

SUMMARY OF THE INVENTION

With the above in view, an object of the present invention is to provide a control device for a power steering apparatus which has eliminated the above-mentioned drawbacks with the prior arts and which can prevent the steering force from suddenly changing due to the failure of the vehicle speed sensor, thus ensuring the safety running of vehicles.

To achieve this object, the present invention provides a control device for a power steering apparatus of which steering force is controlled in accordance with a control signal comprising: means for producing a signal corresponding to a vehicle speed; means for producing a signal corresponding to an engine rotation speed; change relaxation means for relaxing changes in the engine rotation speed signal; and a switching means for delivering the vehicle speed signal when the vehicle speed signal is available and an output signal of the change relaxation means when the vehicle speed signal is lost, as the steering force control signal, respectively.

DETAILED DESCRIPTION OF THE PREFERRED EMBODIMENT

The present invention will be described in detail in connection with a preferred embodiment with reference to attached drawings.

Figure 1:
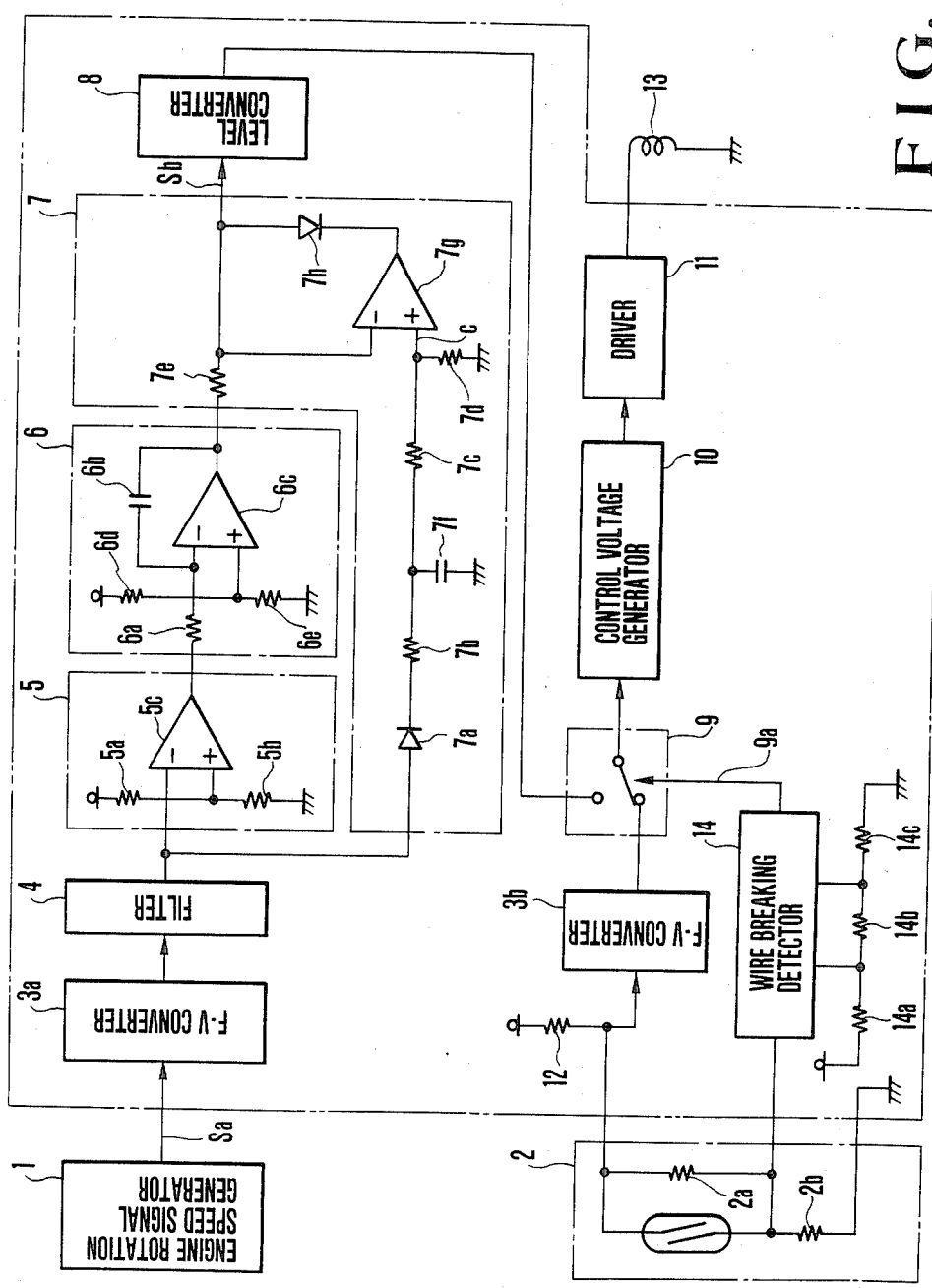
FIG. 1 is a circuit diagram showing an embodiment of a control device for a power steering apparatus according to the present invention.

FIG. 1 is a circuit diagram showing an emobodiment of a control device for a power steering apparatus according to the present invention. The control device in this embodiment comprises an engine rotation speed signal generator 1 which generates a signal corresponding to an engine rotation speed, a vehicle speed sensor 2 for producing a vehicle speed signal, which is comprised of a known sensor capable of detecting abnormal condition of the vehicle speed using a voltage divided by resistors 12, 2a, and 2b, frequency-to-voltage (F-V) converters 3a and 3b, a filter 4 for eliminating ripples included in the output of the F-V converter 3a, an integration start time determination circuit 5, an integrator 6, a limitter 7, a level converter 8, a multiplexer 9, a control voltage generator 10, a driver 11, the resistor 12, a solenoid 13 provided in the power steering apparatus, and a wire breaking detector 14.

More particularly, the F-V converters 3a and 3b output signals having DC voltages corresponding to the frequencies of their input signals, respectively. The level converter 8 produces an output signal such that e.g., when the engine rotation speed is approximately 2,000 r.p.m., the output signal of the converter 8 has a level substantially equal to the output level of the F-V converter 3b at the time of running speed of 50 Km/H. Namely, when a four-cylinder engine is used and the engine rotation speed is 2,000 r.p.m., the engine rotation speed signal has a frequency of 66 Hz ($2000 \times 2/60 = 66$). When a pulse sensor which outputs four pulses per each rotation of the vehicle axle is used, the vehicle speed signal at the time of running speed of 50 Km/H has a frequency of 35.3 Hz ($50 \times 637 \times 4/3600 = 35.3$). Accordingly, when the level converter 8 produces an output signal approximately equal to one half of the input signal thereof, levels of the output signals of the F-V converter 3b and the level converter 8 will be substantially equal to each other.

Moreover, the integration start time determination circuit 5 is composed of resistors 5a and 5b and a comparator 5c, and produces an output signal of logical "1" as an integration enable signal when the engine rotation speed is above a predetermined value. The integrator 6 is composed of resistors 6a, 6d and 6e, a capacitor 6b and an operational amplifier 6c. The limitter 7 is composed of diodes 7a and 7h, resistors 7b to 7e, a capacitor 7f, and an operational amplifier 7g, and functions so that the output level of the integrator 6 does not rise in excess of a level corresponding to one half of the engine rotation speed. It is to be noted that the engine rotation speed signal is produced on the basis of e.g., an ignition signal. The control voltage generator 10 is configured to generate an output signal corresponding to a minimum steering force when no input signal is delivered thereto. In addition, the wire breaking detector 14 for the vehicle speed sensor 2 is constituted to detect a wire breaking mainly using a window comparator. When the input signal of the wire breaking detector 14 is out of a standard range determined based on voltage division by resistors 14a, 14b and 14c the wire breaking detector 14 outputs a signal indicative of the wire breaking to the multiplexer 9.

The operation of the control device thus configured will be described as follows. In normal condition, the multiplexer 9 is connected to the position as shown. Accordingly, a pulse signal produced at the vehicle speed sensor 2 is converted to a dc voltage proportional to a frequency of the pulse signal by the F-V converter 3. The voltage thus obtained is delivered to the control voltage generator 10 through the multiplexer 9. At the control voltage generator 10, a signal for effecting a power steering in correspondence with the input signal is determined. This signal is delivered to the solenoid 13 through the driver 11. Thus, the power steering operation is conducted.

On the other hand, an engine rotation speed signal produced at the engine rotation speed signal generator 1 is converted to a dc voltage by the F-V converter 3a. After undergone noise elimination at the filter 4, the dc voltage is delivered to the integration start time determination circuit 5. In this circuit 5, the resistance values of the resistors 5a and 5b are set so that a signal of logical "1" is produced with respect to a signal delivered when the engine rotation speed is e.g., above 2,000 r.p.m. Then, the output signal from the integration start time determination circuit 5 is integrated by the integrator 6. Thus, even if the engine rotation speed changes to great extent, the output signal of the integrator 6 functions to relax the change.

Figure 2:
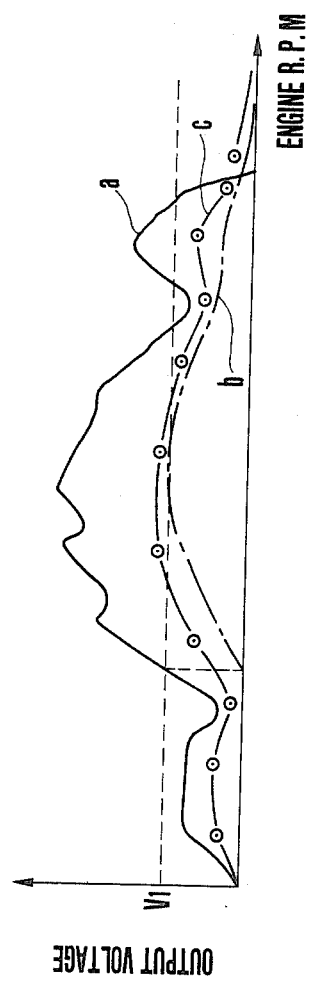
FIG. 2 is a graph showing the characteristic of the control device for a power steering apparatus according to the present invention.

For this reason, when an actual rotation speed of the engine changes, i.e., an output signal Sa from the engine rotation speed generator 1 changes as indicated by the characteristic curve a in FIG. 2, an output voltage Sb of the integrator 6 varies following the change of the characteristic curve a from the time when the voltage of the characteristic curve a is above a voltage $V_1$ corresponding to the engine rotation speed of 2,000 r.p.m. as shown in the characteristic curve b in FIG. 2. However, since this voltage Sb has been integrated, it hardly changes even if the characteristic curve a varies to much extent.

The signal which is delivered to the integration start time determination circuit 5 is delivered to the non-inverting input terminal of the operational amplifier 7g through a voltage division circuit comprising a diode 7a and resistors 7b, 7c and 7d. The circuit constant is selected so that a voltage (labeled c in FIGS. 1 and 2) delivered to the non-inverting input terminal of the operational amplifier 7g is approximately one half of a voltage delivered to the integration start time determination circuit 5. For this reason, when the output voltage of the integrator 6 increases, so that a voltage appearing on the inverting input terminal of the operational amplifier 7g is above the voltage c appearing on the non-inverting input terminal thereof, the operational amplifier 7g becomes operative to immediately absorb the difference therebetween. Accordingly, there is no possibility that the output voltage of the integrator 6 is above the voltage appearing on the non-inverting input terminal of the operational amplifier 7g. Namely, there is no possibility that even when the condition where the engine rotation speed is high is continued, the output voltage of the integrator 6 rises above a predetermined value.

The output signal of the integrator 6 is delivered to the multiplexer 9 through the level converter 8, but there is employed a circuit arrangement such that this output signal is not used when the vehicle speed signal is normally produced. In contrast, when the vehicle sensor 2 becomes out of order and the wire braking detector 14 recognizes this fact, so that a vehicle speed fail signal is delivered to the terminal 9a of the multiplexer 9, the multiplexer 9 is switched to the side opposite to that shown. For this reason, the power steering apparatus which has been controlled by the vehicle speed signal until now is controlled in turn by the output of the level converter 8. Since the output level of the level converter 8 is determined to be substantially equal to the output level of the F-V converter 3b, there is no possibility that there occurs the phenomena such that the steering force suddenly changes at the time of failure of the vehicle sensor. In addition, since the integrator 6 is not caused to be operated until the engine rotation speed reaches about 2,000 r.p.m., a small steering force is ensured by a signal output from the control voltage generator 10 when the vehicle is steered in the halt condition or it runs at a low speed. On the other hand, when the engine rotation speed is above 2,000 r.p.m., the steering force become large in accordance with the output of the integrator 6, with the result that a control is conducted such that the steering force becomes equal to a value responsive to the engine rotational speed, i.e., approximately the vehicle speed at that time. While the vehicle is stopped until the traffic signal shows "proceed" for other reasons, the integrated result is discharged and when the vehicle starts running thereafter, it is possible to drive it with a small steering force until the engine rotation speed reaches 2,000 r.p.m.

As stated above, the control device for a power steering apparatus according to the present invention is configured so that a control is switched to the engine rotation speed responsive control when the vehicle speed signal is lost. Accordingly, this eliminates the possibility that the steering force suddenly changes due to the failure of the vehicle sensor, thus ensuring the safety running of vehicles.

What is claimed is:

1. A control device for a power steering apparatus of which steering force is controlled in accordance with a control signal comprising:
   means for producing a signal corresponding to a vehicle speed;
   means for producing a signal corresponding to an engine rotation speed;
   change relaxation means for relaxing changes in said engine rotation speed signal; and
   a switching means for delivering said vehicle speed signal when said vehicle speed signal is available and an output signal of said change relaxation means when said vehicle speed signal is lost, as said steering force control signal, respectively.

2. A control device as set forth in claim 1, wherein said change relaxation means comprises an integration start time determination circuit to output an integration enable signal when the level of said engine rotation speed signal is above a level corresponding to a predetermined rotation speed, and an integrator responsive to said integration enable signal to integrate said engine rotation speed signal.

3. A control device as set forth in claim 2, wherein said change relaxation means further comprises a limitter responsive to an output signal from said integrator to operate so that the level of said engine rotation speed signal is limited to a predetermined level.

4. A control device as set forth in claim 1, which further comprises a wire breaking detector which supplies said switching means with a signal representing that the level of said vehicle speed signal is out of a predetermined range.

5. A control device as set forth in claim 4, which further comprises a frequency-voltage converter for converting the frequency of said vehicle speed signal to a corresponding voltage to output said vehicle speed signal thus converted to said switching means, said frequency-voltage converter being set to have an output level substantially the same as an output level of said change relaxation means.

6. A control device as set forth in claim 1, wherein said engine rotation speed signal is produced on the basis of an ignition signal.

7. A control device as set forth in claim 4, wherein said switching means is comprised of a multiplexer responsive to said signal from said wire breaking detector to switch the output signal thereof from said vehicle speed signal to said output signal from said change relaxation means.

8. A control device as set forth in claim 1, which further comprises a control voltage generator to generate a control voltage corresponding to a required steering force in response to either said vehicle speed signal or said output signal from said change relaxation means which is delivered thereto as an output signal of said switching means.

* * * * *

UNITED STATES PATENT AND TRADEMARK OFFICE
CERTIFICATE OF CORRECTION

PATENT NO. : 4,702,334

DATED : 10/27/87

INVENTOR(S) : Takeshima et al.

It is certified that error appears in the above-identified patent and that said Letters Patent is hereby corrected as shown below:

| COLUMN | LINE | DESCRIPTION |
|---|---|---|
| 1 | 14 | delete "witha" insert --with-- and --a-- |
| 1 | 21 | delete "This" insert --Thus--. |

Signed and Sealed this

Twenty-fifth Day of October, 1988

Attest:

DONALD J. QUIGG

Attesting Officer

Commissioner of Patents and Trademarks